March 17, 1936.　　　D. S. DE LAVAUD　　　2,034,429
HYDRAULIC TRANSMISSION
Filed Aug. 3, 1933　　　6 Sheets-Sheet 4

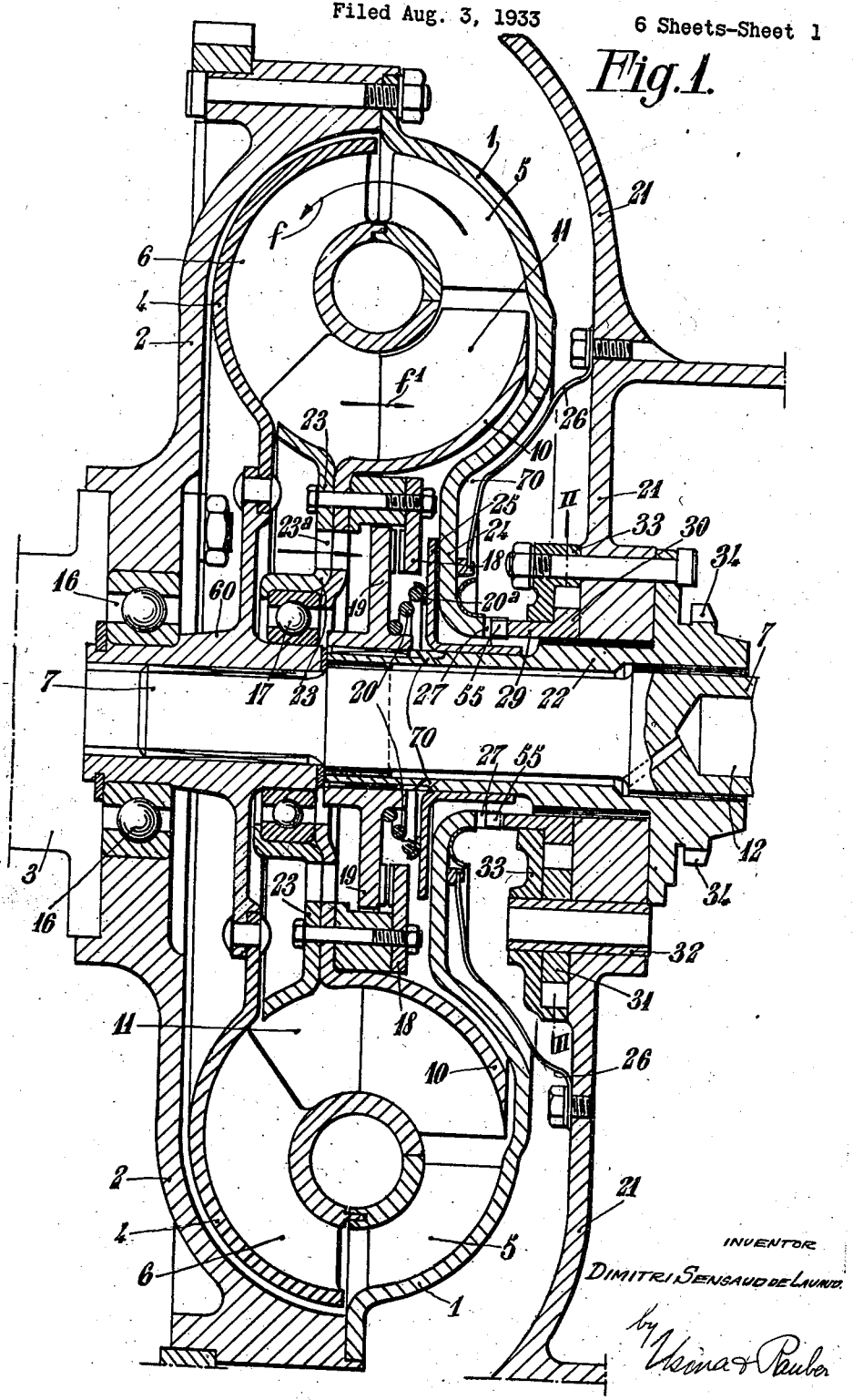

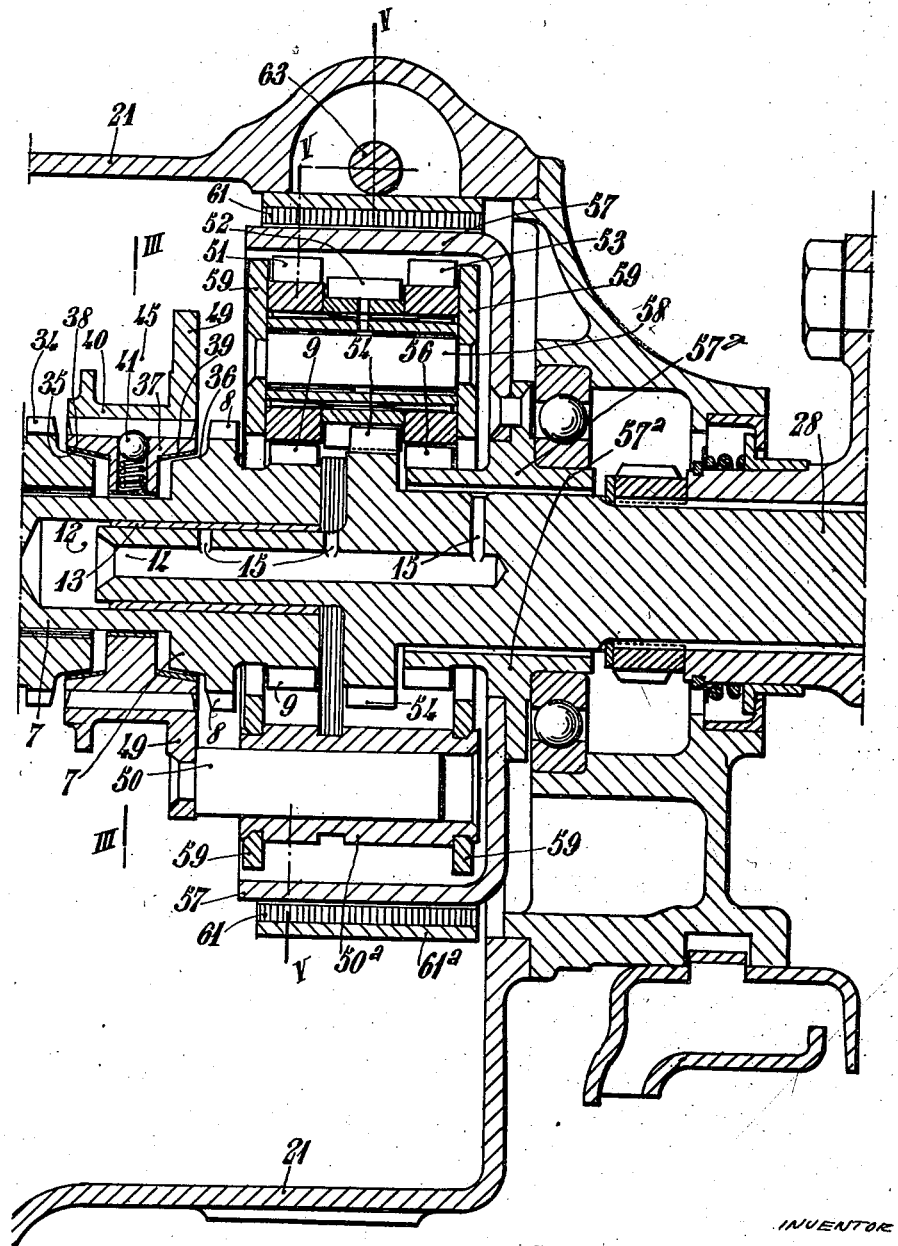

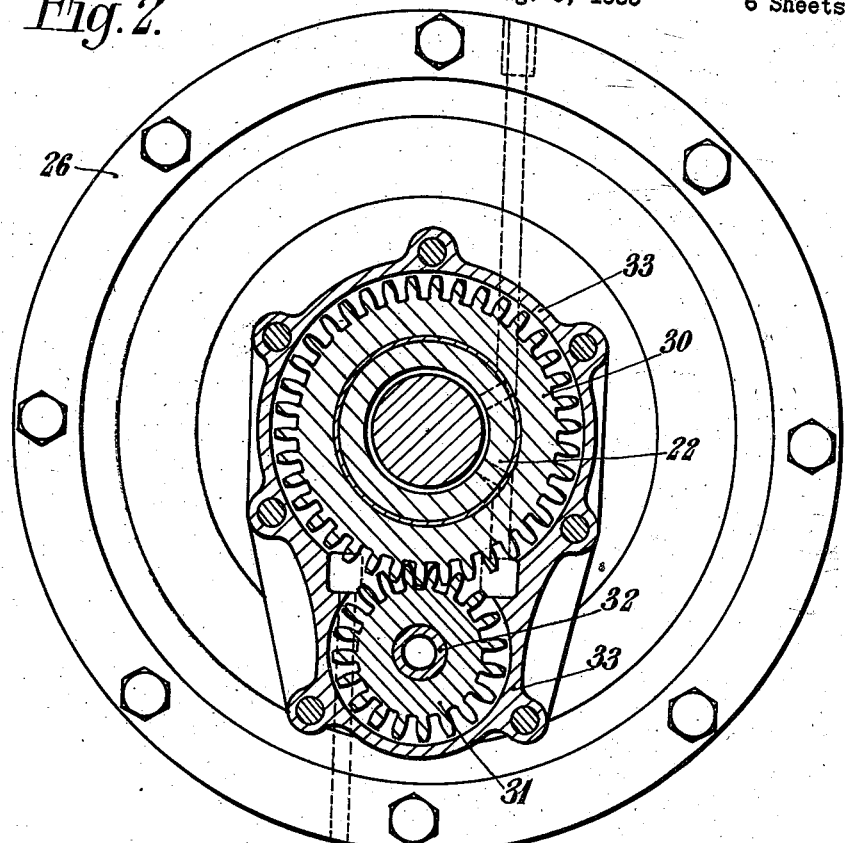
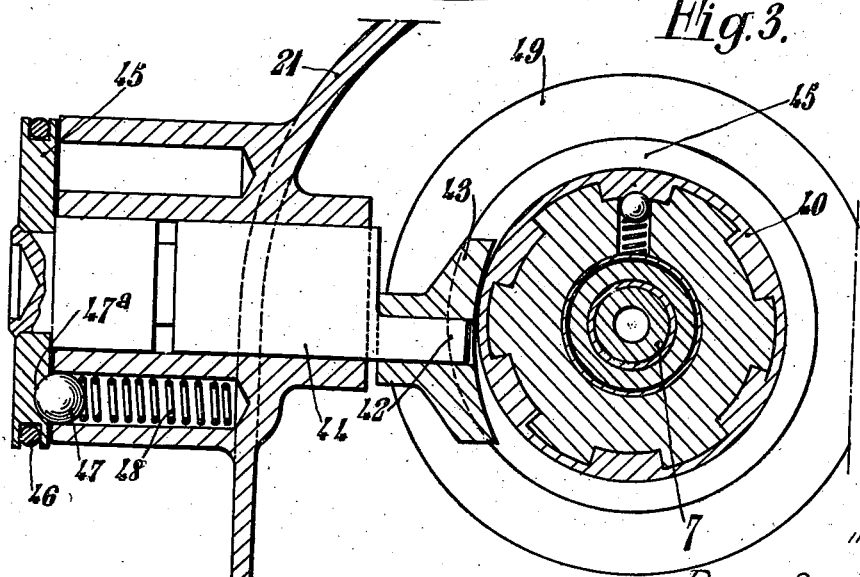

INVENTOR
DIMITRI SENSAUD DE LAVAUD.
by Cheina & Rauber
HIS ATTORNEYS

March 17, 1936.  D. S. DE LAVAUD  2,034,429

HYDRAULIC TRANSMISSION

Filed Aug. 3, 1933  6 Sheets-Sheet 5

INVENTOR

DIMITRI SENSAUD DE LAVAUD

HIS ATTORNEYS

March 17, 1936.  D. S. DE LAVAUD  2,034,429
HYDRAULIC TRANSMISSION
Filed Aug. 3, 1933  6 Sheets-Sheet 6

INVENTOR
DIMITRI SENSAUD DE LAVAUD.
by Heimar Rauber
HIS ATTORNEYS.

Patented Mar. 17, 1936

2,034,429

UNITED STATES PATENT OFFICE 2,034,429

HYDRAULIC TRANSMISSION

Dimitri Sensaud de Lavaud, Paris, France

Application August 3, 1933, Serial No. 683,446
In France October 8, 1932

4 Claims. (Cl. 60—54)

It has been previously proposed to use as a coupling between a motor shaft and a second shaft a hydraulic clutch consisting in general of a centrifugal pump and a co-axially arranged turbine. Such clutches have given excellent results. The slippage has not exceeded about two to three per cent of the speed and decreases in proportion as the speed of the shafts increases, the fluid acting in the manner of a key for fixing the driven shaft to the driver. These couplings, however, have a great disadvantage in not being utilized as speed changing devices. The secondary couple or moment of the forces acting on the driven shaft cannot be in any case greater than the primary couple. Consequently their utilization is very limited by reason of the fact that it is necessary to provide a driving couple at least equal to the couple of the maximum load on the shaft, which is most often the starting couple, which is considerably in excess of that of the load during normal operation.

It has also been proposed to use as couplings hydraulic transmissions (speed-changing devices) of the Föttinger type for example, composed of a centrifugal pump and a turbine between which is interposed fixed directing blades. Such arrangements have the advantage over the first-mentioned couplings of permitting a considerable increase of the secondary couple with an acceptable efficiency.

Such coupling mechanisms, however, have a great disadvantage in that they cannot be employed except for forces approximating those for which they have been designed. For different forces, their efficiency decreases rapidly so that they cannot be utilized efficiently for certain applications such as the driving of motor operated vehicles, in which the force exerted must be variable within extended limits.

Furthermore, it has been necessary with the previous arrangements to provide cooling radiators, which makes the complete apparatus very heavy.

The present invention is an improvement upon apparatus of the general class above mentioned, by which an excellent efficiency is obtained at all speeds of the motor and at all loads on the secondary shaft. Apparatus of this class are described in previously filed applications of Robert Sensaud de Lavaud, Serial No. 667,408, filed April 22, 1933, and of myself Serial No. 675,178, filed June 10, 1933.

In these apparatus the pump is operated by the driving shaft, the turbine operates a driven shaft and an annular guide of circular cross-section is provided between the pump and turbine and carrying blades which may be fixed or may be wholly or partly movable, either automatically or by manual control.

The guide in this type of apparatus may be interposed between the blades of the turbine and those of the pump either at the entrance or at the exit side of the pump blades, or at both sides. The guide may turn freely on the axis of the complete apparatus, and in the direction of rotation of the turbine and the pump, so that the apparatus serves as a coupling. Or the rotation of the guide may be checked or controlled in various ways and by various means so as to convert the complete apparatus into a hydraulic transformer or change-speed device. The control of the guide may be automatic or manual. Or both automatic and manual controls may be provided.

With such an arrangement, when the speeds of the driving and driven shafts are the same, that is, when the couple or moment of the driving force exerted by the motor is equal to the resisting couple exerted by the load, the guide, if free to rotate, will be carried in the same direction and at substantially the same speed as the turbine and the pump. In that case, the oil or other fluid serves practically to key the parts together, the slippage between the pump and the turbine being practically nil. Indeed, the guide could be left free only when the secondary couple is inferior to the primary couple, that is to say, when the speed of the driven shaft is greater than that of the driving shaft.

This arrangement presents the great advantage of being able to operate with a higher speed on the secondary. Or, after having left the guide free, so as to operate the apparatus as a coupler, it can be checked so as to obtain at will an operation at increased speed, the motor shaft continuing to turn at constant speed. Consequently, one can maintain the primary shaft at constant speed and moment, chosen preferably equal to the speed and moment for which the motor operates with maximum efficiency, and obtain on the driven shaft an extended range of speeds and of forces while maintaining an efficiency approximately constant and very high.

In the preferred arrangement, the blades of the pump are fixed in a circular shell which forms a closed casing for the oil or other fluid and the parts through which it passes, and constitutes also a fly-wheel for the apparatus. This construction diminishes the losses by friction and increases the efficiency to the highest point possible and is an important feature of the apparatus.

There are also certain improvements in detail in connection with the present invention, which may be used separately or in various combinations as follows—

A. The means for fixing the guide against rotation can be of various types and controlled
 (a) by a centrifugal regulator acting under control by the speed of the turbine, of the pump or of the vehicle,
 (b) by an electromagnetic arrangement controlled by hand or automatically and of various suitable designs; controlled (if automatic), for example, by the speed of the turbine, the pump or the vehicle,
 (c) by an arrangement operating under control of the suction or vacuum of the motor,
 (d) by an arrangement operating under control of the pressure which the fluid exerts on the blades and on a fixed part of the guide,
 (e) by any one of various mechanical devices controlled by the operator.

Within the scope of the present invention there are included all combinations of the arrangements above indicated permitting particularly the securing at will of an automatic operation or an operation under control of the operator.

B. The regulator may be held by bringing it into engagement with a fixed part of the casing or apparatus either by a frictional engagement or a keyed engagement or by a combination of the sort generally referred to as synchronized gearings.

C. When we wish to obtain the automatic liberation of the guide when the speeds of the pump and of the turbine are the same, we can use balanced pawls carried by the guide which normally engage with a ratchet on a fixed part so as to prevent relative rotation in the opposite direction from that of the turbine and the pump. When the guide is carried along in the same direction as the turbine and pump, the balanced pawls will be lifted out of engagement with the ratchet by centrifugal force acting against springs of a strength determined in accordance with the given speed of rotation of the guide, and will thus avoid the noise of sliding over the ratchet.

D. The guide or distributing blades are arranged so as never to form an obstacle to the passage of the liquid. Thus we avoid defective efficiency when the mechanism functions as a coupler, the guide being free.

E. The turbine is connected with the driven shaft of the mechanism through the intermediation of a speed-reducing gearing, with gears always in engagement. This connection has two positions permitting a direct drive from the turbine or a suitable reduced speed drive.

F. The connection between the speed-reducing gearing and the turbine is obtained by a clutch of a type actuated progressively by friction so as to avoid the noise and the shocks of the engagement of the teeth of the clutch.

G. The arrangement for securing a reverse drive is of the gear type and is combined with the speed-reducing gear. It is actuated by means of a pedal which starting from the neutral point of the clutch, brakes planetary pinions so as to exert a resisting force which causes the rotation of the pinions and consequently the operation of the driven shaft in the reverse direction.

H. The shifting of the clutch is obtained by means of a finger located in a groove of the clutch and mounted eccentrically on the end of a pin. The pin is rocked by means of a flexible driving shaft or cable of the Bowden type; the flexible shaft being actuated by a lever at its other end under control of the centrifugal force exerted by the fly-wheel of the vehicle.

I. The fluid contained within the mechanism is maintained under pressure by means of a pump actuated by any suitable devices. This serves
 (a) to avoid cavitation at any point whatever of the system, and
 (b) to make up for losses.

Tightness between the movable parts and the fixed parts is assured by floating joint members having their outer faces exposed in chambers in which there is no pressure. Such chambers communicate with the suction end of the pump. An adjustable discharge device is arranged between the outlet and the inlet of the pressure pump.

J. The pressure pump is of the gear type, and one of its gears is keyed directly on a sleeve fixed on the hydraulic pump.

K. The conduits through which the fluid under pressure passes in the transmission mechanism are arranged in such a way that the entrance ends of the blades of the pump are located at the center or points of greatest pressure of such fluid.

The accompanying drawings illustrate embodiments of the invention by way of example:

Figs. 1 and 1ª are left and right halves respectively of a vertical, longitudinal section of the complete apparatus;

Fig. 2 is a transverse section on the line II—II of Fig. 1, illustrating the oil pressure pump;

Fig. 3 is a transverse section on the line III—III of Fig. 1ª, illustrating the clutch controlling device;

Figure 5:
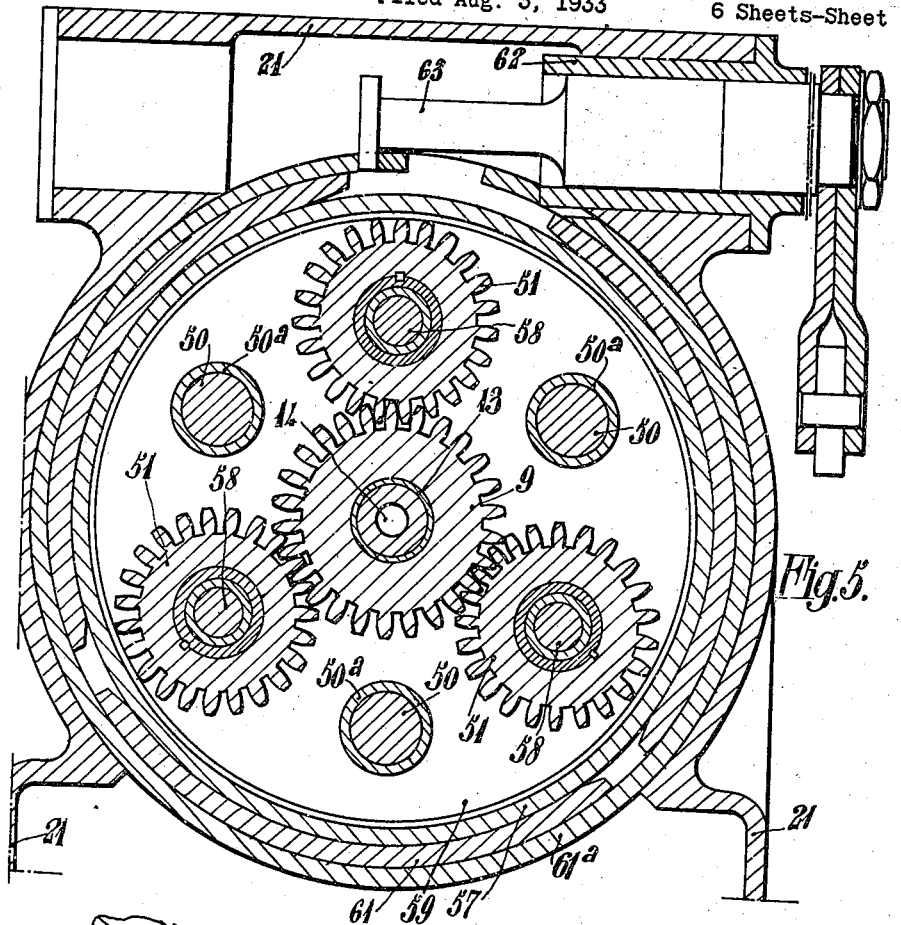
Fig. 5 is a transverse section on the line V—V of Fig. 1ª showing the brake-controlled mechanism for effecting a reverse movement.

Referring to the drawings, a centrifugal pump 1 is bolted to a plate 2 which is fixed on the driving shaft 3, which may be the shaft of the vehicle motor. A turbine 4 with blades 6 opposite to the blades 5 of the pump is fixed on a sleeve 60 which is keyed to one end of a shaft 7.

The shaft 7 is hollow at its other end, which is provided with clutch teeth 8 and gear teeth 9. The shaft 7 is directly driven by the turbine, and actuates the driven shaft 28 of the complete unit through certain intermediate connections. The inner end of the shaft 28 fits in the bore 12 formed in the outer end of the shaft 7, with a packing ring 13 between the two. A bore 14 is provided in the inner end of the shaft 28 communicating with radial ducts 15 to convey oil to the different bearings.

The plate 2 which carries the pump is centered on the sleeve or hub 60 of the turbine through a ball bearing 16.

The guide 10 has blades 11 placed opposite the entrance to the pump blades and the exit from the turbine blades. The blades 11 of the guide are entirely fixed to the shell 10 thereof either by mounting the blades on the shell or casting them with it, and are so placed as to offer no obstacle to the passage of the fluid; thus maintaining a high efficiency when the combination functions as a coupling or clutch.

The guide 10 is mounted loosely through a ball bearing 17 on an inwardly projecting hub of the part 60 carried by the turbine. Fixed to the disc part 60 carried by the turbine. Fixed to the disc 23 of the guide is a crown gear 18 the teeth of which face a similar gear on a disc 19. The disc 19 is splined on a sleeve 22 fixedly connected to the casing 21 of the unit, but can be displaced axially as hereinafter described.

A pack joint member 25 is provided between the sleeve 22 and the central disc 24 of the pump. An elastic packing 26 is provided also between the disc 24 and the casing 21 of the apparatus.

A spring 20 bears at one end against the disc 19 and at the other end against a ring 20ª fixed on the face of the member 25. This spring presses the packing member 25 against the disc 24 of the pump. It also controls the axial displacement of the disc 19 and normally presses the two crown gears out of engagement. The engaging portions of the ring 18 and disc 19 are provided with corresponding teeth which may be plain or conical or a combination of these shapes to constitute gearing of the synchronized type, which facilitates the bringing of them into engagement with each other.

The disc 23 of the guide 10 may be provided with a series of perforations 23ª designed to permit the free passage of the fluid and exercise of its pressure on the adjacent face of the disc 19.

At the inner part of the disc 24 there are provided teeth 27 which engage teeth 55 formed on a sleeve 29 which is fixed on one of the gear wheels 30 of the gear type pump shown in Fig. 2. This gear wheel 30 engages another gear wheel 31 mounted freely on a shaft 32. The pump casing 33 is bolted to the frame 21.

The passages through which the oil or other fluid flows back to the pump are arranged between the shell of the pump 1 and the shell of the guide 10. The entrance to the blades 5 of the pump where the refilling oil enters is at the center of maximum pressure on the fluid within the coupling. From this point forward the pressure is converted into velocity, which increases as the oil is forced through the pump and diminishes as the oil drives the turbine and flows through the blades of the latter and back to the starting point at the pump entrance.

The sleeve 22 carries outside of the turbine chamber a gear 34 of the same size as the gear 8 on the shaft of the turbine. See Fig. 1ª. These gears 34 and 8 carry hubs at their adjacent ends which are conical as shown at 35 and 36. Between the two gears is a coupling member with a hub 37 having its periphery toothed like the gears 34 and 8 and having at opposite ends conical bores 38 and 39 corresponding to the hubs 35 and 36. Around this toothed hub is a drum 40 with internal teeth engaging those of the hub. The drum can be shifted axially to the right or to the left and to bring the gear 8 or the gear 34 into locking engagement with the hub. An impositive lock consisting of a ball 41, spring pressed outward into engagement with a socket in the surrounding drum, prevents the free or accidental shifting of the drum from its central position on the hub 37.

Figure 4:
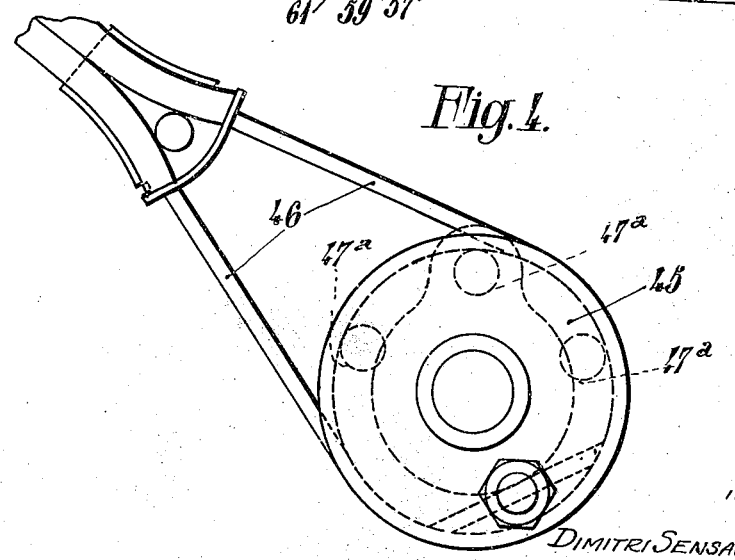
Fig. 4 is an elevation of the same.

A device for shifting the drum is illustrated in Fig. 3. Located in the annular groove 45 of the drum there is a plate 43 held on the end of a finger 42 which is mounted eccentrically on the end of a rock shaft 42 journalled in the casing 21 and carrying fixed on its outer end a pulley 45 which is held impositively by a ball 47 pressed outward by a spring 48 and adapted to enter any one of three recesses 47ª (see Fig. 4) in the pulley. Fixed at any suitable point within the groove of the pulley is a flexible shaft or cable 46 of the Bowden type. The ball 47 will be engaged in the proper recess 47ª of the pulley in order to prevent its free or accidental movement from the intended position, the three recesses 47ª corresponding to the three positions, right, left or center of the coupling member.

The drum 40 is rigidly connected to the cage or frame which carries a set of planetary pinions. For this purpose the disc 49 forming part of the drum carries short shafts 50 which enter tubular spacers 50ª set at intervals around the plates 59 forming the cage for the planetary pinions. (See Fig. 5.) The cage carries shafts 58 on which are mounted three sets of pinions 51, 52 and 53. The pinions 51 and 53 are identical, and the pinions 52 smaller in accordance with the speed reduction desired. The pinions 51 engage the gear 9 which is fixed on the hollow shaft 7 of the turbine. The pinions 52 engage a gear 54 fixed on the driven shaft 28.

The pinions 53 engage a gear 56 formed on a hub 57ª to which is attached a drum 57. The drum is normally free to rotate but is surrounded by the jaws 61 of a brake. The brake strap 61ª which carries the jaws or shoes 61 is fixed at one end and is connected at the other end to a shaft 63 (Fig. 5) which is arranged to slide in a bearing 62 in the upper part of the frame 21.

The complete arrangement is so constituted that this control can be effected either on the right or on the left.

The complete frame 21, or casing, constitutes a reservoir of fluid for the pressure pump.

The operation of the apparatus is as follows:— The connection between the turbine shaft 7 and the gearing is supposed to be at the idle point, the drum 40 not being in engagement with either of the gears 34 and 8.

When the driving shaft is started in rotation by the motor, it rotates the pump 1 and the fluid is displaced by centrifugal force in the direction of the arrow f, Fig. 1, through the spaces between the blades of the pump. It then passes between the blades of the turbine 4. As it emerges from the turbine, the blades of the guide guide it to the entrance to the pump blades. Thus the fluid moves in substantially a closed cycle. This movement of the fluid, given correct form of the blades, carries the turbine 4 around in the same direction as the pump 1.

The fluid possesses at the discharge from the blades of the turbine a certain pressure, greater as the speed of the turbine is less. This pressure is applied to the rear or left-hand face of the disc 19. The disc is thus displaced to the right against the resistance of the spring 20 and the gears of the discs 19 and 18 engage. This stops the rotation of the guide. The speed of the turbine increases toward equality with that of the pump, the pressure on the disc 19 diminishes, the latter is pushed to the left by the spring 20, and consequently the guide 10 is freed for rotation and is carried in the same direction as the turbine and the pump. Thus as the turbine gets up to comparatively high speed, the guide is released and turns with the other parts and thus avoids frictional losses in the passage of the fluid through it.

The turbine 4 in rotating carries with it the shaft 7. The pinion 9 at the right-hand end of this shaft is always in engagement with the planetary pinions 51. But the entire cage being free, the pinions 51 can roll on the pinion 9 and the driven shaft 28 remains at rest.

If now we shift the clutch drum 40 toward the right, it carries with it the hub 37 by reason of the impositive engagement between these two parts. The cones 39 and 36 engage so that both parts rotate and permit the easy further movement of the drum to bring its teeth into engagement partly with those of the gear 8.

The cage 59, which is fixed to rotate with the drum, is thus rotated at the same speed as the shaft 7. The pinions 51 being engaged with the gear 9, we have practically a rigid connection between the shaft 7 of the turbine and the driven shaft 28. The latter, therefore, is driven directly by the turbine shaft.

If, starting from the idle point, we shift the drum 40 and the hub 37 to the left, we will first brake or retard the rotation of the hub by the frictional engagement of the conical faces 35 and 38, and will by a further movement bring the teeth of the drum partially into engagement with the fixed gear 34. This holds the cage 59 rigidly against rotation. The pinions 51, 52 and 53 are thus fixed in position. The pinions 51 and 52 being fixed on the same shaft 58, the driven shaft 28 will be rotated (at reduced speed) through the intermediation of these pinions by the gear 9 on the turbine shaft.

In the two preceding cases, if the brake 61 is applied to the drum 57, this will retard or stop the previously free gear 56 and prevent the rotation of the pinions 53 and their shafts and the pinions 51 and 52. If the cage is coupled to the turbine shaft through the gear 8, the turbine shaft, the cage and driven shaft 28 are interlocked and the brake action is applied to the turbine. Similarly, if the cage is coupled to the fixed gear 34, the effect of the brake is transmitted to the turbine shaft.

Assuming again that the coupling between the shaft 7 and the reducing gear is at the idle point, the application of the brake to the drum 57 will cause a diminution of the speed of rotation of the pinions 53 in proportion to the braking effect, because the engagement of the pinion 51 with the gear 9 determined such speed. By thus retarding the rotation of the pinions 53 on their shafts, the three pinions and their shafts will be carried around in their planetary movement. As the braking action is continued and completed, the driving of the pinions through the gear 9 will cause the backward rotation of the complete cage (the pinions 53 rolling over the fixed gear 56) rotating the cage backward at a reduced rate, and driving the shaft 28 also at a reduced rate.

We have explained in connection with Fig. 1 that the freeing of the guide 10 is effected automatically when the pressure of the fluid discharged from the turbine reaches or approaches zero. The arrangement of the different organs serves also to preserve an approximate balance between the pressure of the fluid on the shell and the blades of the turbine with the pressure exercised on the guide directly and through the disc 19; the pressure on the disc 19 being balanced by the fluid pressure in the opposite direction which is taken up by the bearing 17 keyed to the hub 60 of the turbine.

Figure 6:
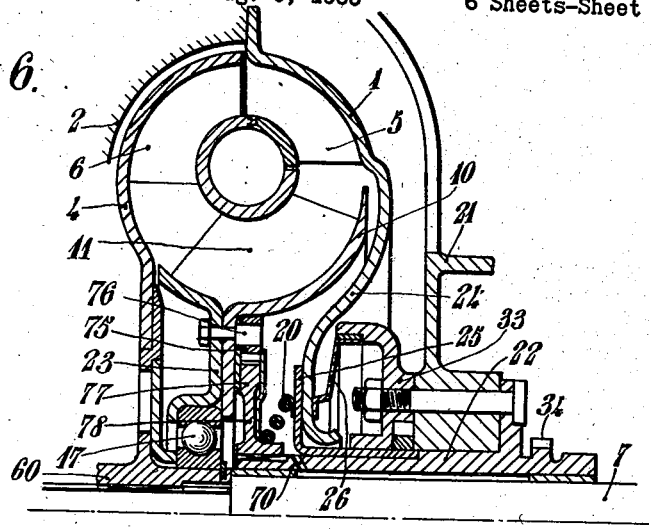
Fig. 6 is a partial transverse section similar to Fig. 1 but illustrating a modification of the automatic mechanism for freeing the guide.
Figure 7:
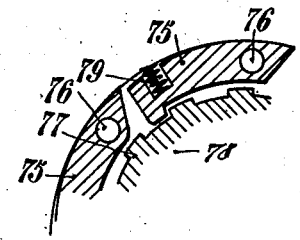
Fig. 7 is a section on an enlarged scale through the ratchet and pawl of Fig. 6.

The modification shown in Figs. 6 and 7 differs from the first described arrangement in the arrangement connecting the guide 10 with the fixed sleeve 22.

In Fig. 6 the disc 23 of the guide carries balanced pawls 75 (Fig. 7) turning on pins 76 carried by the disc. The pawls 75 are arranged to engage the teeth of a ratchet 77 on the periphery of a disc 78 which is fixed against annular and axial movement by being keyed on the sleeve 22 which is fixed to the casing 21. The pawls 75 are held in engagement with the ratchet by their weight and by springs 79 of determined strength located in holes in the outside part of the pawls and bearing at their opposite ends on the shell 10 of the guide. The pawls 75 lock the guide only against rotation in the direction opposite to that of the pump. They permit free forward movement of the guide.

At the starting of the pump and while the speed of the turbine is less than that of the pump, the pressure of the fluid on the blades of the guide 10 tends to turn the latter backward. But the pawls 75 engaging the ratchet teeth prevent this movement.

When the speed of the turbine and of the pump are substantially the same, the guide is naturally carried in rotation in the same direction. When the speed of the guide reaches a value for which the springs have been gauged, the centrifugal force pushes the pawls outward against their weight and the springs. This not only releases the guide from all mechanical control, but also avoids the noise which would be produced by the pawls riding over the ratchet. As soon as the speed of the turbine 4 becomes less than that of the pump 1, the fluid acts on the blades of the guide to brake them against rotation, and the pawls 75 come into engagement with the ratchet teeth 77, preventing the guide 10 from turning backward.

Figure 8:
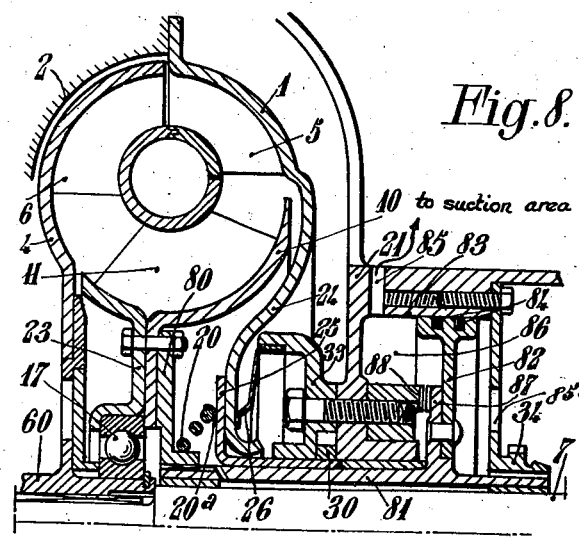
Figs. 8, 9 and 10 are partial transverse sections similar to Fig. 1 but illustrating modified arrangements for controlling the rotation of the guide.
Figure 9:
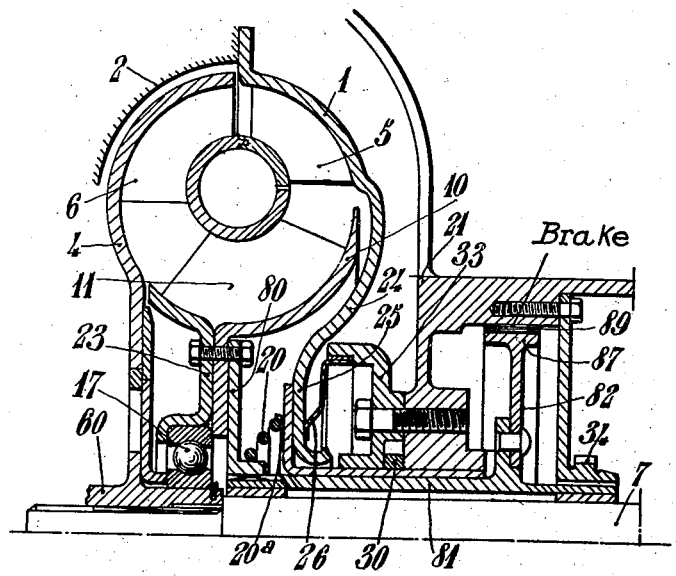
Figure 10:
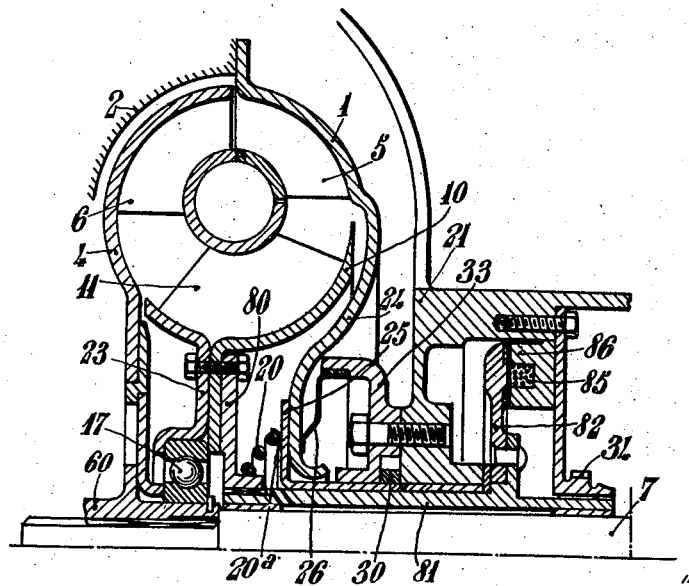

Figs. 8, 9 and 10 show other variants of the guide control. In each of these the disc of the guide 10 is fixedly attached to a disc 80 splined on the sleeve 81 and the latter is shiftable axially and carries on its outer end means for fixing the guide 10 against rotation.

In Fig. 8 a disc 82 is fixed on the outer end of the sleeve 81 and with the sleeve is movable under control of the vacuum of the motor. To this end, the disc moves within a bore 83 with packing rings 84 to prevent the passage of air from one side of the disc to the other. The chamber 86 at one side of the disc communicates through an opening 85 in the casing with suitable conduits and distributor, which in turn communicate with a chamber on the suction or vacuum side of the motor.

On the inner face of the disc 82 there is a crown gear 87 facing a similar crown gear 88 mounted on the fixed frame 21 of the apparatus. The space at the outer side of the disc 82 is open to the outer air by way of a port 85ª. When the suction of the motor is effective within the chamber 86, the disc 82 is shifted to the left and brings the gears 87 and 88 into engagement, which fixes the guide against rotation. The spring 20 forces the crown gears apart when the suction is lessened sufficiently. The gears 87 and 88 can be provided with any suitable teeth or can be substituted by a frictional engagement or can combine these two schemes. The control of the distributor which regulates the admission of the vacuum to the chamber 86 can be automatic or manual, or both at will. In any case the control can be effected by any usual or suitable devices.

In the arrangement of Fig. 9, the disc 82 carried on the sleeve 81 has a peripheral drum 87 to which are applied brake jaws or shoes of a brake 89 controlled by any convenient means; which in turn are controlled directly by the operator, or automatically, or both, so as to free or to fix the guide at will.

According to Fig. 10 the displacement of the movable disc 82 in the axial direction is effected by an electromagnetic device 85, and the fixing of the disk against rotation is effected by the friction of the disc 82 on a ring 86 fixed to the casing of the machine and carrying or constituting part of the electromagnet.

Or there might be provided teeth or other locking means on the disc 82 and on the casing 21 which would come into play on the excitation of the electromagnet. Such excitation may be controlled by hand or automatically or in both ways and by any usual or suitable means.

The invention is not limited to the particular embodiments illustrated. Various modifications may be made by those skilled in the art without departure from the invention as defined in the following claims.

I claim:

1. A hydraulic transmission comprising a rotary centrifugal pump, a rotary turbine coaxial with the pump and driven by the fluid from the pump, an annular rotatable guide in the return circuit between the pump and the turbine, releasable means for holding the guide from rotation and means actuated by the pressure of the fluid being pumped to actuate said releasable holding means.

2. A hydraulic transmission comprising a rotary centrifugal pump, a rotary turbine co-axial with the pump and driven by the fluid from the pump, an annular rotatable guide in the return circuit between the pump and the turbine, releasable means for holding the guide from rotation, a controlling means actuated by a difference in fluid pressure on opposite sides of said guide to hold and to release said holding means.

3. A hydraulic transmission comprising a rotary centrifugal pump, a rotary turbine co-axial with the pump and driven by the fluid from the pump, an annular rotatable guide in the return circuit between the pump and the turbine, releasable means for holding the guide from rotation, non-rotating means slidable axially of said transmission to engage and disengage said holding means and means actuated by pressure differences on opposite sides of said guide to move said non-rotating means into and out of engagement with said guide.

4. A hydraulic transmission including in combination a rotary centrifugal pump, a rotary turbine co-axial with the pump and driven by the fluid from the pump, an annular rotatable guide in the return circuit between the pump and the turbine, releasable means for holding the guide from rotation in either direction and means actuated upon a predetermined speed of rotation of said turbine relative to said pump to release said holding means and permit said guide to rotate.

DIMITRI SENSAUD DE LAVAUD.